(12) United States Patent
Muscat

(10) Patent No.: US 7,044,542 B2
(45) Date of Patent: May 16, 2006

(54) BICYCLE SEAT

(76) Inventor: Armond Muscat, P.O. Box 251, Algonquin, IL (US) 60102

( * ) Notice: Subject to any disclaimer, the term of this patent is extended or adjusted under 35 U.S.C. 154(b) by 0 days.

(21) Appl. No.: 10/452,115

(22) Filed: Jun. 2, 2003

(65) Prior Publication Data

US 2004/0239159 A1 Dec. 2, 2004

(51) Int. Cl.
*B82J 1/00* (2006.01)
(52) U.S. Cl. .............. 297/215.15; 297/195.1; 297/195.11; 297/463.1; 403/90; 248/219.2; 248/219.4; 248/228.51
(58) Field of Classification Search ......... 297/195.102, 297/214, 215.13, 215.15, 195.11, 463.1, 463.2, 297/326, 314; 403/90, 114, 122, 131; 248/219.2, 248/600, 430, 219.4, 288.31, 288.51
See application file for complete search history.

(56) References Cited

U.S. PATENT DOCUMENTS

| 468,398 | A | * | 2/1892 | Sherman | 297/213 |
| 478,166 | A | * | 7/1892 | Madsen | 482/146 |
| 487,081 | A | * | 11/1892 | Staples | 297/213 |
| 929,272 | A | * | 7/1909 | Baron | 248/583 |
| 2,244,956 | A | * | 6/1941 | Miller et al. | 297/214 |
| 2,719,571 | A | * | 10/1955 | Taylor | 248/371 |
| 3,992,054 | A | * | 11/1976 | Campagnolo | 297/215.15 |
| 4,155,590 | A | * | 5/1979 | Cunningham | 297/215.15 |
| 5,020,852 | A | | 6/1991 | Marion | |
| D326,782 | S | | 6/1992 | Scarcella | |
| 5,469,592 | A | | 11/1995 | Johnson | |
| 5,979,978 | A | * | 11/1999 | Olsen et al. | 297/215.15 |
| 6,056,356 | A | | 5/2000 | Unger, Jr. | 297/201 |
| 6,079,774 | A | * | 6/2000 | Proust | 297/195.1 |
| 6,135,550 | A | | 10/2000 | Tucho | |
| 6,361,108 | B1 | * | 3/2002 | White | 297/195.1 |
| 6,402,235 | B1 | * | 6/2002 | Letendre | 297/195.1 |
| 6,471,291 | B1 | | 10/2002 | Dodge et al. | |
| 2001/0008348 | A1 | | 7/2001 | Nelson | |
| 2002/0067059 | A1 | | 6/2002 | Kaptur | |

FOREIGN PATENT DOCUMENTS

| DE | 2416635 | | 1/1975 |
| GB | 2076756 | * | 12/1981 |
| GB | 2093779 | | 9/1982 |
| JP | 406315421 | | 11/1994 |

OTHER PUBLICATIONS

Bjerklie, David, "Sex and the Serious Cyclist" (Time, Oct. 28, 2002, p. 69).
Parker-Pope, Tara, "Score One for the Couch Potatoes: New Studies Link Bicycling to impotence" (Health Journal).

* cited by examiner

*Primary Examiner*—Laurie K. Cranmer
(74) *Attorney, Agent, or Firm*—Welsh & Katz, Ltd.

(57) ABSTRACT

In one form of the invention, a rounded bicycle seat is provided. The seat has no front pommel that is a significant factor in causing most pressure and pain to the crotch area of a rider. As such, the bicycle seat is designed to relieve numbness. In one embodiment of the current invention, the seat is provided with a rounded dome portion that minimizes or makes no contact with the crotch area of the rider when the bicycle seat is in use. Further, the seat may pivot in multiple directions in connection with the rider's movement, giving the rider proper coordination and alignment with the seat and the bicycle pedals. The seat is anatomically correct and provides support for the rider with a snug comfortable fit, while at the same time improves balance, flexibility and improves body strength with the least amount of friction and pain experienced by the rider.

13 Claims, 3 Drawing Sheets

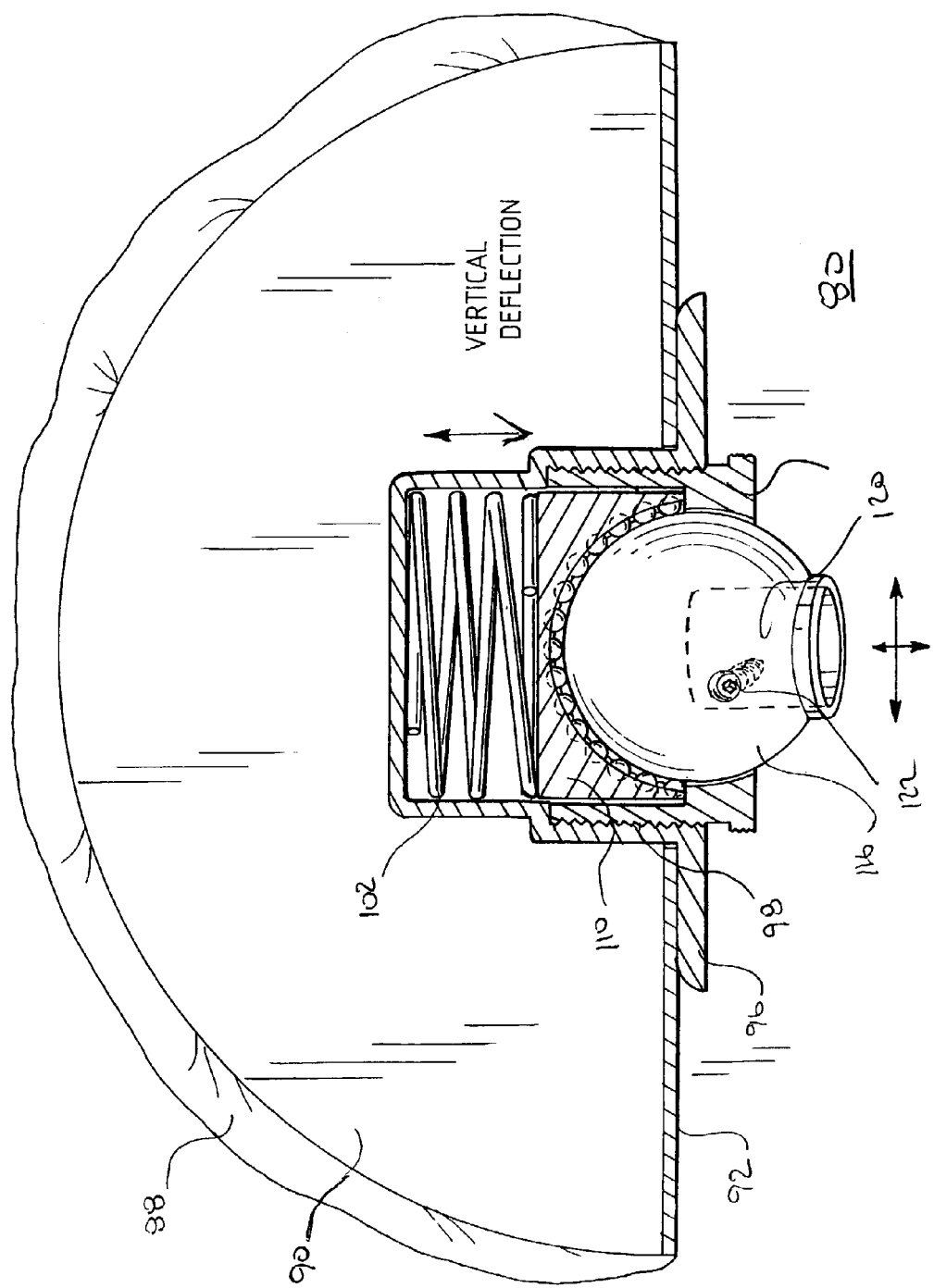

BICYCLE SEAT

FIELD OF THE INVENTION

The present invention relates to bicycle seats, and more particularly to rounded bicycle seats that also pivot and provide for a more comfortable seat that minimizes pressure and pain for the bicycle rider.

BACKGROUND OF THE INVENTION

Bicycle seats of various types are well known in the art. When a cyclist uses a bike, often the cyclist will be required to sit on the bicycle's seat for long periods of time. Some cyclists ride their bikes daily for commuting to work and/or exercise purposes. Traditional bicycle seats are saddle-shaped and put much of the rider's weight on the pubic tubercle and ischiopubic ramus of the pelvis. There have been numerous reports by cyclists, amateurs and professionals alike, who suffer adverse effects therefrom. Typical adverse experiences, caused by pressure induced by the currently designed saddle-shaped bicycle seat resulting in blunt trauma to the perineal and pelvic structures, suffered include the following symptoms: groin numbness or paresthesia, penal numbness or paresthesia, forms of impotence.

With traditional bicycle seats, the horn of the saddle seat fits directly against the aforementioned pelvic structures. This results in occlusion of arteries and veins supplying blood flow to the penis as well as, compression of local nerves as they are sandwiched between the horn of the bicycle seat and the bony structures of the anterior pelvis. The resulted outcome is a numbing effect or paresthesia, as reported by many cyclists that can result in sustained paresthesia of the groin and penis, delayed or immediate impotence and perhaps even an elevated prostate specific antigen. Thus, it is proper to conclude that there is a major problem with bicycle seat design.

The present invention overcomes these and other problems inherent in existing bicycle seats. The present invention provides a bicycle seat that is designed to relieve numbness. The seat has no front pommel which is a significant factor in causing most pressure and pain to the crotch area of a rider. In one embodiment of the current invention, the seat is provided with a rounded dome portion that minimizes or makes no contact with the crotch area of the rider when the bicycle seat is in use. Further, the seat, in one embodiment, may pivot in multiple directions in connection with the rider's movement, giving the rider proper coordination and alignment with the seat and the bicycle pedals. The seat is anatomically correct and provides support for the rider with a snug comfortable fit, while at the same time improves balance, flexibility and body strength with the least amount of friction and pain experienced by the rider.

The principal object of the present invention is to provide an improved bicycle seat, that has no front pommel and relieves numbness and reduces pressure and pain to the rider's crotch area.

Another object of the present invention is to provide a novel bicycle seat that is rounded in shape.

Still another object of the present invention is to provide a novel bicycle seat that can pivot in multiple directions.

A further object of the present invention is to provide a bicycle seat that is anatomically correct and supports the bicycle rider with a snug comfortable fit.

A further object of the present invention is to provide a novel bicycle seat that improves balance and flexibility with the least amount of pain experienced by the bicycle rider.

A further object of the present invention is to provide a novel bicycle seat which is simple in design and inexpensive to construct, and is durable and rugged in structure.

Still further objects and advantages will become apparent from a consideration of the ensuing description and drawings of the invention.

These and other objects are achieved by a bicycle seat of the present invention.

BRIEF SUMMARY OF THE INVENTION

In one form of the invention, a bicycle seat is provided which comprises a rounded seat. The bicycle seat is designed to relieve numbness. The seat has no front pommel that is a significant factor in causing most pressure and pain to the crotch area of a rider. In one embodiment of the current invention, the seat is provided with a rounded dome portion that minimizes or makes no contact with the crotch area of the rider when the bicycle seat is in use. Further, the seat, in one embodiment, may pivot in multiple directions in connection with the rider's movement, giving the rider proper coordination and alignment with the seat and the bicycle pedals. The seat is an anatomical correct and provides support for the rider with a snug comfortable fit, while at the same time improves balance, flexibility and improves body strength with the least amount of friction and pain experienced by the rider.

BRIEF DESCRIPTION OF THE DRAWINGS

FIG. 4 is a cross sectional view of another alternate embodiment of the bicycle seat of the present invention.

DETAILED DESCRIPTION OF THE INVENTION

Figure 1:
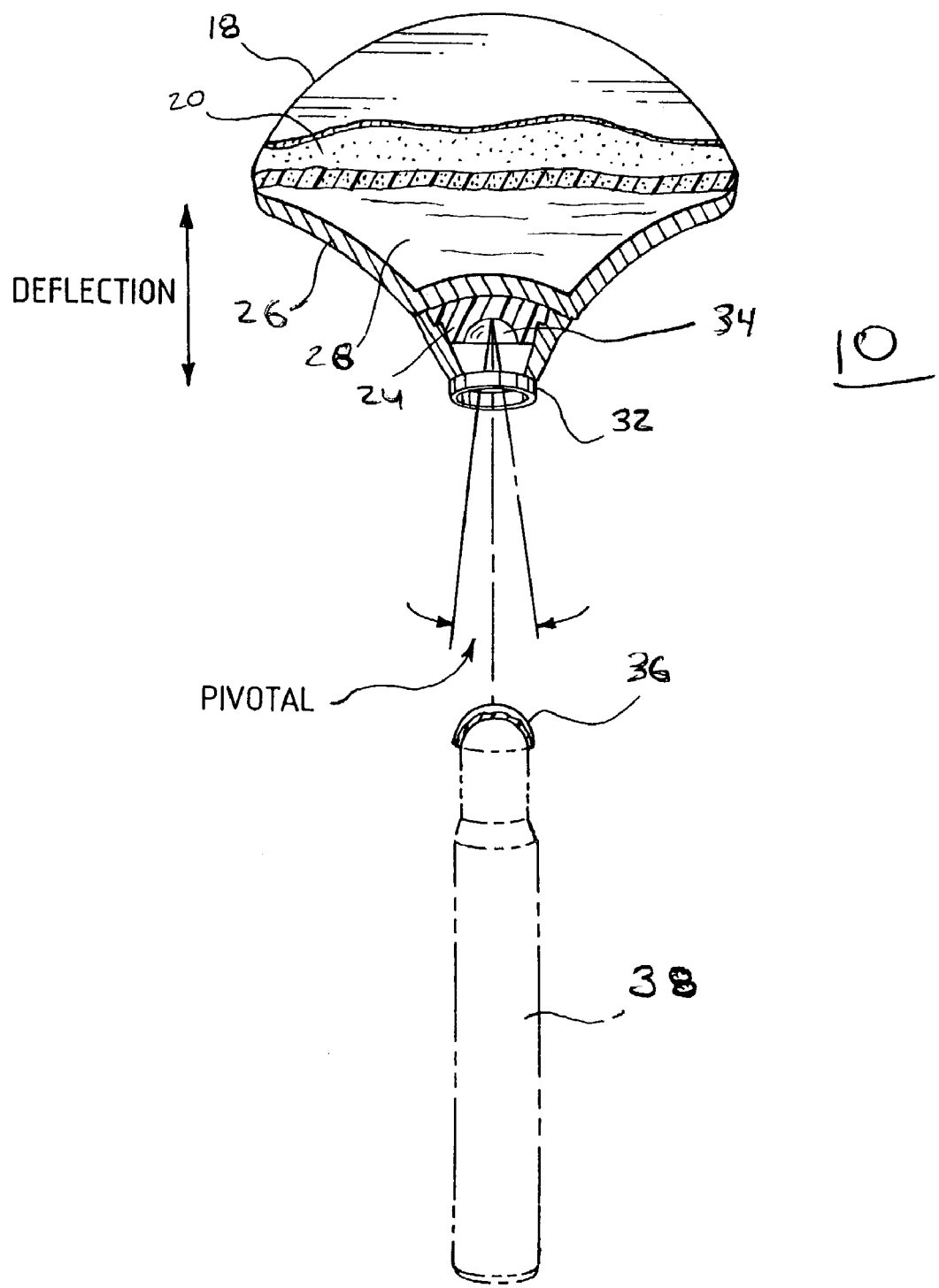
FIG. 1 is a front partial cross-sectional view of one embodiment of the bicycle seat of the present invention shown being aligned with a bicycle post.

FIG. 1 is a front view of one embodiment of the bicycle seat 10 constructed in accordance with the present invention. As shown in FIG. 1, bicycle seat 10 comprises a cover 18, a convex cushion 20, a pivotal socket 24, a concave reinforced flexible material base 26. Further, as shown in FIG. 1, bicycle seat 10 comprises shock absorbing material 28, a secure flexible collar 32, a recess 34 defined in pivotal socket 24, a bike post 38 having a post cap 36.

Cover 18 may be formed of a variety of different materials such as for example, rubber, plastic, or any combination of synthetic or natural materials that will provide for proper operation of the cover 18. The cover 18 outer surface may be smooth or textured in design.

The convex cushion 20 may be made of a variety of different types of materials such as, for example, foam, gel, air, rubber or any combination of cushioning substances that will provide for proper operation of cushion 20.

The shock absorbing material 28 may be made of a variety of different types of materials such as, for example, foam, gel, air, rubber or any combination of cushioning substances that will provide for proper operation of seat 10.

The concave reinforced flexible material base may be made of a variety of different materials, for example, a strong flexible resin material, plastic, wood, steel, aluminum, or a variety of combinations of different materials to provide for proper operation of base 26. As shown in FIG. 1, pivotal socket 24 defines a recess 34. Bike post 38 may have mounted on one end a post cap 36. Secure flexible collar 32 accepts post cap 36 and bike post 38 whereby nylon post cap 36 mates with recess 34 in pivotal socket 24. During this mating engagement, seat 10 is pivotally mounted to bike post 38. Post cap 36 is pivotally engaged to pivotal socket 24 to provide for ease of pivotal movement of bike seat 10 with respect to bike post 38. Further, bike seat 10 may deflect in a substantially vertical motion with respect to bike post 38 when post cap 36 is mated with pivotal socket 24. Collar 32 assists to maintain post 38 and cap 36 in place within recess 34. In yet other embodiments, bike post 38 may mate directly, without a post cap, to pivotal socket 24.

Post cap 36 may be formed of a variety of different materials to provide for a minimal amount of friction while providing minimal wear between post cap 36 and pivotal socket 24. For example, post cap 36 may be constructed of nylon, plastic, low friction metal or a variety of different materials or combinations of materials to provide for minimal friction between post cap 36 and pivotal socket 24.

During use, a rider would sit on seat 10 and start to pedal the bicycle. The rounded dome seat 10 makes minimal or no contact with the crotch area of the rider. Convex cushion 20 and shock absorbing material 28 provide considerable comfort for the rider. During the bicycle ride, the seat 10 pivots in multiple directions with respect to the bike post 38. Further, seat 10 experiences deflection when a bumpy road or other irregular surface is encountered. This pivotal movement and/or deflection provides the rider with better coordination and alignment of the rider's body with the seat 10, the bicycle pedals and handlebars of the bicycle. Further, the rider realizes correct anatomical support and the seat 10 provides a snug comfortable fit. At the same time, seat 10 improves balance and flexibility and assists with rider body strength which is realized with the minimal amount of friction and pain caused to the rider. Also, the seat 10 multi-directional movement enhances and strengthens the muscles of the rider's spine and trunk. Even though the rider is not always aware of the seat movement, the rider's positioning will constantly adapt, adjust and balance to correct the rider's riding posture on the bicycle. During the process, the rider gains strength in muscles in the back, abdomen and legs, due to increased blood flow through the body which is not restricted by the seat 10. The rider will be able to ride longer and enjoy the experience more due to less pain and fatigue than with a conventional seat.

Figure 2:
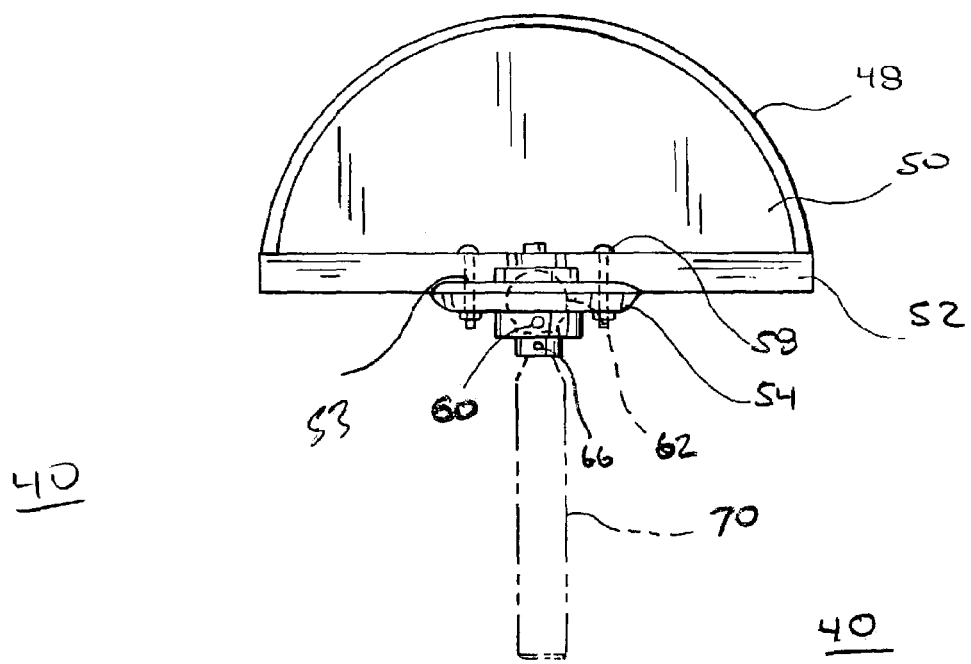
FIG. 2 is a front view of another embodiment of a bicycle seat of the present invention.

FIG. 2 is a front view of another embodiment of a bicycle seat of the present invention. As shown in FIG. 2, bicycle seat 40 comprises a cover 48, a convex cushion 50, a base 52, a socket flange 54, one or more fasteners 58. Further, bicycle seat 40 comprises a removable stationery pin 60, a ball 62 connected to socket flange 54, one or more set screws 66. Further illustrated in FIG. 2 is a bike post 70.

Figure 3:
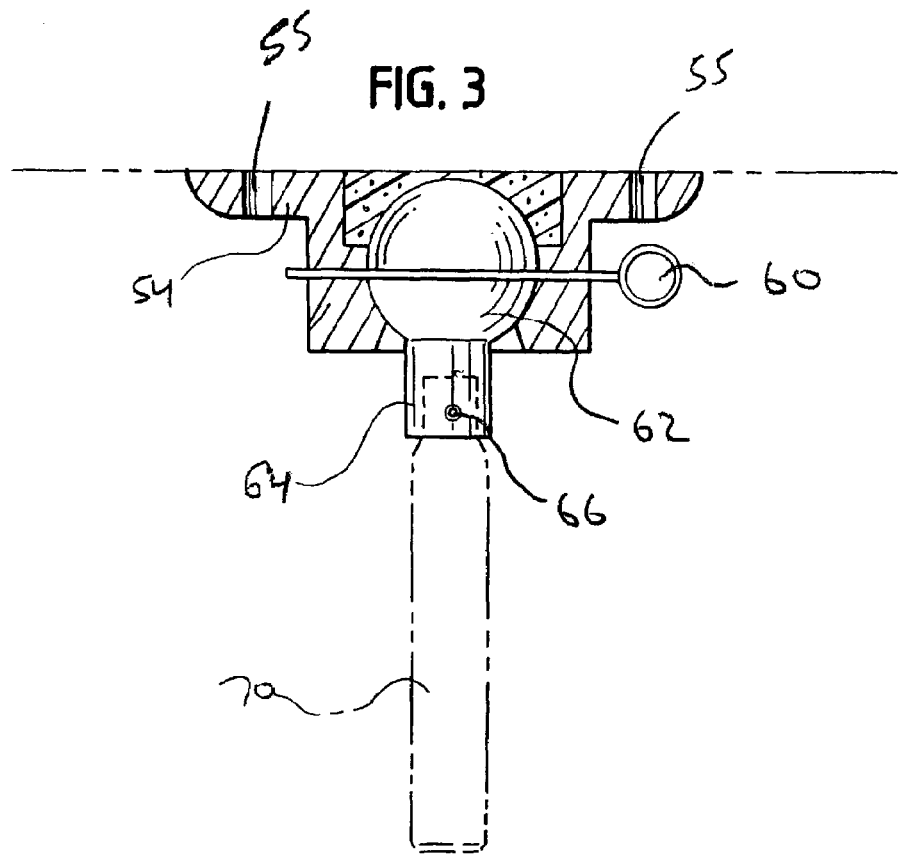
FIG. 3 is a cross-sectional view of a an alternate embodiment of a universal adapter that can attach to an existing seat.

FIG. 3 is an alternate embodiment of a universal adapter that can attach to an existing bicycle seat or any other seat that would allow for pivoting of the seat. As shown in FIG. 3, the universal adapter comprises a removable stationery pin 60, a ball 62 connected to socket flange 54, one or more set screws 66. Further illustrated in FIG. 3 is a bike post 70.

As shown in FIG. 2 cover 48 is positioned over convex cushion 50. Cover 48 may be comprised of a variety of different materials, such as for example, smooth or textured material. The material may be made of rubber, plastic or any type of synthetic or natural materials that will provide for proper operation of cover 48.

Cushion 50 may be made of a variety of different materials such as, for example, foam, gel, air, rubber, or any combination of cushioning materials that will provide for proper operation of seat 40. Cushion 50 is located adjacent base 52.

Base 52 may be made of a variety of different materials such as for example, plywood, hard rubber, steel, stainless steel, aluminum, plastic or a combination of materials. As shown in FIG. 2, base 52 has one or more holes 53 that will accept fasteners 58. Positioned below base 52 is socket flange 54 which contains one or more holes 55 that align with holes 53 in base 52. Socket flange 54 may be removably connected to base 52 by using one or more fasteners 58. Fasteners 58 may be a variety of different fasteners, such as for example, carriage bolts, screws, rivets, or a variety of other types of fasteners used to securely connect base 52 to flange 54.

Ball 62 pivotally connects to socket flange 54 whereby base 52 is pivotally connected to ball 62. Ball 62 comprises a neck 64 which provides for bike post 70 to fit one end of post 70 within neck 64. One or more set screws 66 connect neck 64 to bike post 70 by securely tightening screw(s) 66 through neck 64 against one end of post 70 inserted inside of neck 64. In an alternate embodiment, a pin 60 may be provided to removably secure ball 62 within flange 54. When pin 60 is inserted into flange 54 and through ball 62, ball 62 does not rotate within flange 54. Therefore, seat 40 remains stationary with respect to post 70. Pin 60 may be easily removed by pulling pin 60 out of ball 62 and flange 54 thereby allowing seat 40 to pivot with respect to post 70.

During use, a rider would sit on seat 40 and start to pedal the bicycle. The rounded dome seat 40 makes minimal or no contact with the crotch area of the rider. Convex cushion 50 provides considerable comfort for the rider. During the bicycle ride, the seat 40 pivots in multiple directions with respect to the bike post 70. This pivotal movement provides the rider with better coordination and alignment of the rider's body with the seat 40, the bicycle pedals and handlebars of the bicycle. Further, the rider realizes correct anatomical support and the seat 40 provides a snug comfortable fit. At the same time, seat 40 improves balance, flexibility and assists with rider body strength which is realized with the minimal amount of friction and pain caused to the rider. Also, the seat 40 multi-directional movement enhances and strengthens the muscles of the rider's spine and trunk. Even though the rider is not always aware of the seat movement, the rider's positioning will constantly adapt, adjust and balance to correct the rider's riding posture on the bicycle. During the process, the rider gains strength in muscles in the back, abdomen and legs, due to increased blood flow through the body which is not restricted by the seat 40. The rider will be able to ride longer and enjoy the experience more due to less pain and fatigue than with a conventional seat.

FIG. 4 shows yet another embodiment of bicycle seat 80 of the present invention. As shown in FIG. 4, in one embodiment, bicycle seat 80 may comprise a cover 88, a convex cushion 90 and a base 92. Further, seat 80 may comprise a flange 96 connected to base 92, a threaded housing 98 removably inserted within flange 96, a spring 102, a roller bearing 110 and a ball 116. The ball 116 may define a hole 120 and one or more set screws 122 may be provided.

As shown in FIG. 4, cover 88 is positioned over convex cushion 90. Cover 88 may be comprised of a variety of different materials, such as for example, smooth or textured material. The material may be made of rubber, plastic or any type of synthetic or natural material that will provide for proper operation of cover 88.

Cushion 90 is located adjacent base 92. Cushion 90 may be made of a variety of different materials such as, for example, foam, gel, air, rubber, or any combination of cushioning materials that will provide for proper operation of seat 80.

Base 92 may be made of a variety of different materials such as for example, plywood, hard rubber, steel, stainless steel, aluminum, plastic or a combination of materials. Positioned below base 92 is flange 96 which may be removably or non-removably attachech to base 92.

As shown in FIG. 4, in one embodiment, flange 96 may be connected to base 92 whereby a portion of flange 96 projects into cushion 90. Inserted and secured within flange 96 is threaded housing 98 substantially as shown in FIG. 4. Further, ball 116 is securely and rotatably mounted within flange 96 whereby threaded housing 98 supports and pivotally connects ball 116 to flange 96. Spring 102 securely rests against the portion of flange 96 that is inserted into cushion 90. Roller bearing 110 is positioned against spring 102 whereby roller bearing 110 is seated adjacent one end of ball 116. At the opposite end of ball 116, hole 120 may receive a bicycle post and whereby one or more set screws 122 may securely During use, a rider would sit on seat 80 and start to pedal the bicycle. The rounded dome seat 80 makes minimal or no contact with the crotch area of the rider. Convex cushion 90 provides considerable comfort for the rider. During the bicycle ride, the seat deflects and rises in multiple directions with respect to the bike post. Spring 102 in combination with cushion 90 absorbs much of the impact and reduces discomfort for the rider. This vertical movement provides the rider with better coordination and alignment of the rider's body with the seat 80, the bicycle pedals and handlebars of the bicycle. Further, the rider realizes correct anatomical support and the seat 80 provides a snug comfortable fit. At the same time, seat 80 improves balance, flexibility and assists with rider body strength which is realized with the minimal amount of friction and pain caused to the rider. Also, the seat 80 vertical movement enhances and strengthens the muscles of the rider's spine and trunk. Even though the rider is not always aware of the seat movement, the rider's positioning will constantly adapt, adjust and balance to correct the rider's riding posture on the bicycle. During the process, the rider gains strength in muscles in the back, abdomen and legs, due to increased blood flow through the body which is not restricted by the seat 80. The rider will be able to ride longer and enjoy the experience more due to less pain and fatigue than with a conventional seat.

Specific embodiments of novel methods and apparatus for construction of novel rounded bicycle seats according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A pivotable bicycle seat for mounting to a bicycle post that automatically adjusts to accommodate the position of a rider on the seat, said seat comprising:
    a base defining the bottom portion of the seat;
    a ball having a neck wherein said neck can receive the post; and
    a means for pivotally securing the ball to the base, connected to generally the center of the base, to enable the base to pivot in any direction with respect to the post and provide for the base to pivot and adjust as the position of the rider changes while the bicycle is in motion and the rider is positioned on the seat; said means for pivotally securing having a top portion and a bottom portion, each top and bottom portion having a substantially concave recess to accept the ball so that the ball can pivot within each recess and the ball is not gripped by either recess, said bottom portion defining an opening located in the concave recess and whereby the ball is pivotally secured in the recesses between the top and bottom portions so that the neck extends through the bottom portion opening to enable the neck to be connected to the post.

2. The seat of claim 1 further comprising a cushion that is substantially convex shaped across its entire outer surface area and is positioned on the base.

3. The seat of claim 2 further comprising a cover that fits over the convex shaped cushion.

4. The seat of claim 1 wherein the means for pivotally securing is one or more flanges attached to the base.

5. The seat of claim 1 further comprising a hole disposed in the ball portion.

6. The seat of claim 5 further comprising a pin that can be positioned inside the hole in the ball to prevent the ball from pivoting with respect to the means for pivotally securing the ball.

7. A bicycle seat for mounting to a bicycle post that automatically adjusts to accommodate the position of a rider on the seat, said seat comprising:
    a base having an upper portion and a lower portion and defining the bottom portion of the seat;
    a rounded shaped cushion positioned on the upper portion of the base;
    a ball having a neck wherein said neck can receive the post; and
    a means for pivotally securing the ball to the base, connected to generally the center of the base, to enable the base to pivot in any direction with respect to the post and provide for the base to pivot and adjust as the position of the rider changes while the bicycle is in motion and the rider is positioned on the seat; said means for pivotally securing having a top portion and a bottom portion, each top and bottom portion having a substantially concave recess to accept the ball so that the ball can pivot within each recess and the ball is not gripped by either recess, said bottom portion defining an opening located in the concave recess and whereby the ball is pivotally secured in the recesses between the top and bottom portions so that a portion of the ball and neck extends through the bottom portion opening to enable the neck to connect to the post.

8. The bicycle seat of claim 7 wherein the means for pivotally securing is one or more flanges attached to base.

9. The bicycle seat of claim 8 further comprising a hole disposed in the ball portion that can accept a pin to prevent the ball from pivoting with respect to the means for pivotally securing the ball.

10. A pivotable bicycle seat for mounting to a bicycle post that automatically adjusts to accommodate the position of a rider while the bicycle is in motion and the rider is positioned on the seat, said seat comprising:

a base having an upper portion and a lower portion and defining the bottom portion of the seat;

a substantially convex shaped cushion positioned on the upper portion of the base;

a ball having a neck extending from the ball and wherein the neck defines a chamber that can accept one end of the bike post; and a flange having a top portion and a bottom portion, each top and bottom portion having a substantially concave recess to pivotally accept the ball so that the ball can pivot within each recess and the ball is not gripped by either recess, said top portion attached generally to the center of the base lower portion whereby the flange bottom portion connects to the flange top portion to enable the ball to pivot in any direction between the two flange portions and provide for the neck to extend outward from the flange bottom portion to enable the neck to connect to the post.

11. The seat of claim 10 further comprising a cover that fits over the cushion.

12. The seat of claim 10 further comprising a hole defined in the ball and a hole defined in the flange lower portion.

13. The seat of claim 12 further comprising a pin that can be positioned inside the hole in the ball and the hole in the flange lower portion to prevent the seat from pivoting with respect to the post.

* * * * *